(12) United States Patent
Liu

(10) Patent No.: US 11,902,359 B1
(45) Date of Patent: *Feb. 13, 2024

(54) NETWORKED DEVICE CONTROL USING A HIGH-LEVEL PROGRAMMING INTERFACE

(71) Applicant: 8x8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,949

(22) Filed: Feb. 7, 2023

Related U.S. Application Data

(63) Continuation of application No. 16/013,680, filed on Jun. 20, 2018, now Pat. No. 11,575,732.

(60) Provisional application No. 62/523,971, filed on Jun. 23, 2017.

(51) Int. Cl.
*H04L 67/10* (2022.01)
*G10L 15/22* (2006.01)

(52) U.S. Cl.
CPC .............. *H04L 67/10* (2013.01); *G10L 15/22* (2013.01); *G10L 2015/223* (2013.01)

(58) Field of Classification Search
CPC .... H04L 67/10; G10L 15/22; G10L 2015/223
See application file for complete search history.

(56) References Cited

U.S. PATENT DOCUMENTS

| | | | |
|---|---|---|---|
| 6,920,441 B2 | 7/2005 | Zyarko et al. | |
| 6,922,411 B1 | 7/2005 | Taylor | |
| 6,985,478 B2 | 1/2006 | Pogossiants et al. | |
| 8,018,921 B2 | 9/2011 | Pogossiants et al. | |
| 8,532,090 B1* | 9/2013 | Petit-Huguenin | H04L 65/103 370/352 |
| 9,553,755 B2 | 1/2017 | Anisimov et al. | |
| 2002/0032725 A1* | 3/2002 | Araujo | H04L 9/40 709/229 |
| 2010/0217837 A1* | 8/2010 | Ansari | G10L 15/22 709/224 |

(Continued)

OTHER PUBLICATIONS

USPTO Notice of Allowance dated Jun. 23, 2023, received for U.S. Appl. No. 17/878,571 of the instant Applicant/Assignee, 9 pages.

*Primary Examiner* — Chris Parry
*Assistant Examiner* — Dixon F Dabipi
(74) *Attorney, Agent, or Firm* — Crawford Maunu PLLC

(57) ABSTRACT

Certain exemplary aspects directed to customization of communications services wherein a data communications server provides virtual office features to remote client entities. This server is configured to: use a set of instructions written in a first programming language to provide, over a data-communication network, a set of virtual office features as part of data-communications services available to remotely-situated client entities; generate at or receive from a client server communicatively coupled to the data communications server and associated with a particular one of the client entities, another set of instructions written in a second programming language by populating the other set of instructions with client-specific directives, wherein the second programming language is a subset of the first programming language and associated with the virtual office features; and use the client-specific directives to adjust selected ones of the virtual office features for endpoint devices associated with the particular one of the client entities.

20 Claims, 6 Drawing Sheets

(56) References Cited

U.S. PATENT DOCUMENTS

| | | | |
|---|---|---|---|
| 2015/0039917 A1* | 2/2015 | Morikawa | G06F 1/32 |
| | | | 713/310 |
| 2016/0105424 A1* | 4/2016 | Logue | H04L 12/2809 |
| | | | 726/7 |
| 2017/0161031 A1* | 6/2017 | Kim | G09G 5/005 |
| 2018/0295176 A1* | 10/2018 | Sundaresan | G06F 3/167 |

* cited by examiner

NETWORKED DEVICE CONTROL USING A HIGH-LEVEL PROGRAMMING INTERFACE

OVERVIEW

Aspects of various embodiments are directed to communication and computing services. Data communications platforms have allowed individuals to transmit and receive data communications using broadband Internet connections in place of traditional telephone lines. A data communications endpoint device can use a broadband Internet connection to connect to a data communications server that is managed by a data communications service provider. The data communications server can handle communication routing and provide other data communications services for the data communications endpoint device.

Computing servers are increasingly being used to provide various data communications services over a network including, but not limited to, routing of Voice over Internet Protocol (Data communications) communications and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services.

The use of data communications services has been widespread and significant in terms of both number of users and types of services being made available. This growth may be attributable to any of a wide variety of socio-economic changes such as the mobility of users of these services, the types and reduced costs of portable communication tools, and the ever-evolving technology adapting to the personal and business needs of the communications users.

For business entities, the increased use of data communications services has been particularly complex, largely due to providing the same level of personal features to users from the vantage point of each business entity's communications platform. As examples, a data communications service provider such as 8×8, Inc. can be providing such data communications services to a multitude of business entities each of which uses the provided services for a customized platform configured to provide communications services to a wide range of employees. For each such customized platform, it can be particularly burdensome for the data communications service provider to adjust and reconfigure the customized platform (of each respective business entity to which such services are being provided) each time a business entity (e.g., as requested by the entity's IT department, employee(s) or others) changes in terms of the employee's communications equipment/endpoint devices.

SUMMARY

Various example embodiments are directed to issues such as those addressed above and/or others which may become apparent from the following disclosure concerning systems and methods for networked device control using a high-level programming interface.

Embodiments are directed toward methods for use in communications systems employing a data communications server operated by a communications provider, where the data communications server is on the data communications provider side, to provide data communications services to a multitude of client entities. In such contexts, the data communications server may be referred to as a data communications provider server. In such systems, the data communications server includes one or more computer processor circuits (configured with access to databases stored in memory circuits) and configured to act as a communications-control engine for routing, processing communications and/or providing related communications services on behalf of client entities. Such client entities may be exemplified respectively as the above-noted businesses with employees ranging in number from just a few to thousands, and being located/mobile for communications services in any of a multitude of venues. In these embodiments, such methods use the communication-control engine to provide such communications services by receiving data communications telephone communications from data communications endpoint devices, and identifying client-specific sets of control data (e.g., providing directives or commands with communication processing data) derived from a first instruction-configurable/programmable language that is associated with a message exchange protocol that is used between the data communications routing server and data sources. Examples of such client-specific sets of control data may include other forms of code providing data and/or instructions over an interface facilitating communication between the communications provider and the data communications endpoint devices. Such methods execute the client-specific sets of control data to make decisions on how to route communications placed by the data communications endpoint devices, and to identify a set of instructions (written in a second instruction-configurable/programmable language) associated with the routing decisions. The first and second programmable languages may be similar, in that both languages are derivatives of a same type of programmable language, but the first and second programmable languages may differ in terms of content and use. The first programmable language may identify communication processing directives provided to the communications provider by the client entity, whereas the second programmable language may identify communication routing directives as provided by the communications provider. Such methods execute the set of instructions to retrieve data from the data sources maintained by the communications provider, and provide, in response to the data, communication control functionality for the data communications placed by the endpoint device.

Certain embodiments are directed toward an apparatus comprising a computing server configured to communicate with and control a plurality of endpoint devices each respectively associated with an account of a respective one of a plurality of disparate client entities according and responsive to client-specific sets of control data. The apparatus further comprises a processing circuit communicatively coupled to the computing server. The processing circuit is configured and arranged to, for each of the plurality of disparate client entities, provide a set of instructions written in a first programming language. As discussed herein, the first programming language relates to a message exchange protocol between the computing server and data sources. The processing circuit is further configured and arranged to receive, from each respective client entity, a set of instructions written in a second programming language. Moreover, the processing circuit is configured to receive operating state information from endpoint devices associated with the client entity and trigger an action on one or more of the endpoint devices by executing client-specific sets of control data derived from the set of instructions. In such a manner, endpoint devices of a client may be controlled by the computing server (e.g., a data communications server), according to instructions provided by the client.

As described herein, the high-level programming language used by the data communications provider, and the high-level programming language used by the client entities are related programming languages. The data communications provider server is configured and arranged to provide to the client entities, a set of instructions written in a first programming language that defines a message exchange protocol between the data communications provider server and data sources. The set of instructions include aspects of the message exchange protocol to be populated with client-specific directives associated with virtual office features available the client entities. The data communications provider server is further configured and arranged to receive from each respective client entity, programming instructions written in a second programming language that is compatible with the first programming language, and which include the client-specific directives. The first and second programming languages are related languages, whether indirectly or directly related via at least one level of translation. For example, C++, compiled to assembly/object level code and converted to a higher-level, different language or set of instructions. Client-specific sets of control data may be derived from the programming instructions received from each client entity and stored for use by the data communications provider. The client-specific sets of control data further define the message exchange protocol between the data communications provider server and data sources.

Certain embodiments are directed toward a data communications client server comprising one or more computer processor circuits coupled to memory circuits and configured to interface with the data communications provider server. In such embodiments, the data communications client server is configured to receive from the data communications provider server, a set of instructions written in the first programming language. The data communications client server is further configured to generate client-specific sets of programming instructions based on directives received as input on behalf of a respective client entity, where the programming instructions are written in a programming language that is a subset of the first programming language. Client-specific sets of control data may be derived from the programming instructions received from the client entity, where the client-specific sets of control data specify how endpoint devices of the client entity are to be controlled by the data communications server. The data communications client server may therefore provide communication control functionality to end-users (e.g., endpoint devices) of the client entity.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
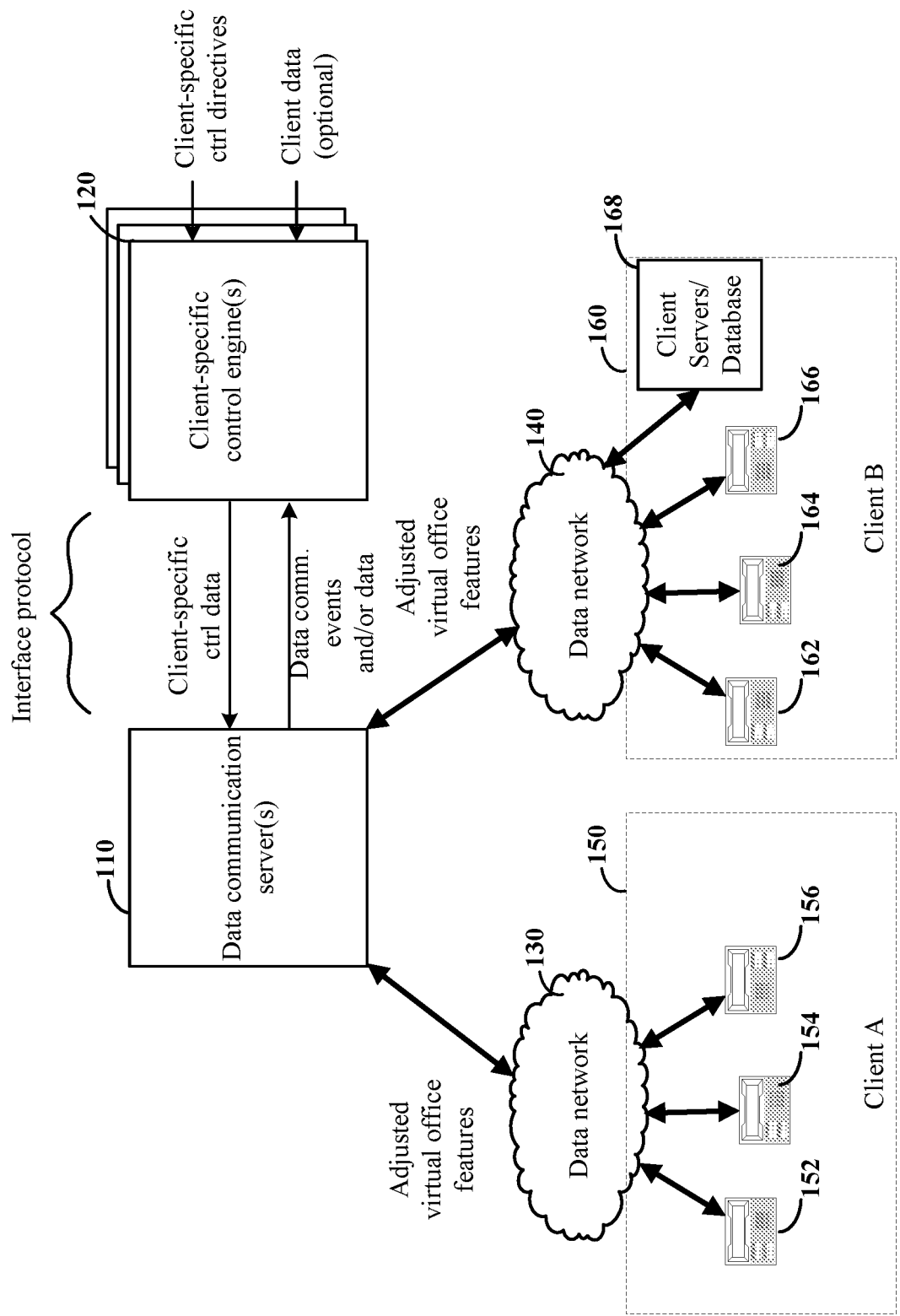
FIG. 1 is a diagram for a data communications-capable system that uses a high-level programming language for communication control functionality and operations, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving networked device control using a high-level programming interface. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Some remote service providers customize their services for different customers. This might include customizable auto attendants, communication routing, communication forwarding, voicemail, or other features. For particularly large clients with many different telephone accounts and numbers, implementing and updating these types of customizations can be a significant undertaking. Certain embodiments of the present disclosure are directed toward an interface that allows a client-specific control engine to access and dynamically adjust the manner in which remote services are provided for the users of a client account during operation, while maintaining the integrity and security of the underlying system providing the remote services. Moreover, embodiments of the present disclosure are directed toward control of networked devices using the interface. As used herein, networked devices refer to interconnected physical devices, vehicles, buildings, and other items embedded with electronics, software, sensors, actuators, and network connectivity which enables the devices to collect and exchange data (such as, over the internet). Such networked devices may, in some instances, be referred to as Internet of things (IoT), though examples are not so limited.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

According to certain embodiments, a data communication system may be configured to allow a client-specific control engine to dynamically modify and control the communication flow and processing at different levels within the system, including (re)routing of incoming communications generally and by way of private branch exchanges (PBXs) and Internet Protocol PBXs (or IP PBXs) to provide intelligent routing relative to receptionists and direct dial numbers for individuals using the IP PBXs. Within these constraints, a customer can write code that self-describes the building blocks or particular configurations used in the customer's particular application, which can be interpreted and executed by the data communications provider. In various embodiments, the building blocks or particular configurations and the data communications servers that execute the building blocks or particular configurations can be configured to interface with other sources of data and control. This can include, for example, flow control decisions that are based upon code running on the client side or on the provider side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

Rules of various complexity can be used for routing incoming communications, whether to one or more receptionists, directly to extensions, to voicemail, or for other communication routing purposes. Similarly, rules of various complexity can be used to control devices associated with particular client entities. The logic used for the control of the networked devices can be based upon directives and related data shared across multiple PBXs, data that can be dynamically changed, and upon rules and logic that can be defined according to multiple tiers of communication routing decisions. For example, a large company may have many different offices or store locations. Portions of the communication routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating the data communication system, particularly in situations where there are many thousands of extension rules can be a difficult proposition.

The data communication system described herein provides inbound and outbound communication routing for one or more PBXs. A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

The data communications system may be configured as a Platform as a Service (PaaS) that provides a user with access to, among other things, telephone communication routing control, PBX functions, computer telephony integration (CTI), and data analytics (in this context the user can refer to, e.g., person, group, server or CPU, or subscribing business entity). Embodiments of the present disclosure are directed toward an interface that allows users of the data communications system solution to access data communications telephone capabilities of the underlying system, including its hardware and software components, while maintaining the integrity and security of the underlying system. Particular embodiments are directed toward a communications solution that allows for customized control of endpoint devices in the data communications system.

The ability to access the underlying data communications services, including communication routing and communication control engines, can provide a platform that is both flexible and simple to implement from the viewpoints of both the data communications provider and the customers of the data communications provider. The communications solution can be configured to modify the virtual office features available to different end-users, and to control the communication flow and processing at all levels within the system, including (re)routing of incoming communications to different PBXs. When compared to an add-on type service where a communication is first handled by a separate PBX, the communications solution may offer a number of advantages and additional features including, but not limited to, increased communication routing capabilities, scalability, and reduced complexity. For instance, access to PBX functions allows for simple communication redirection to extensions or DID numbers provided by the PBX. Moreover, the communications solution allows a data communications client having multiple end-users (and multiple endpoint devices) to customize the manner in which each of the endpoint devices associated with the client are controlled, without compromising the security of the underlying system or requiring additional customization by the data communications provider.

The data communications servers providing the underlying function for the data communications system can be configured to utilize a programmable (or configurable) communication protocol such as a high-level, domain-specific programming language as might be implemented with respective data communications servers providing data communications routing and IP PBX functions on respective sides of an interface configured to facilitate the communications via the defined protocol. A particular example of a data communications server may use session initiation protocol (SIP) to handle various communication functions (e.g., call setup and tear down). However, the various embodiments discussed herein are not necessarily limited thereto. Consistent with the above and in other embodiments disclosed herein, the data communications servers can be configured to establish a leg of the communication from the data communications endpoint devices to another data communications endpoint device or to endpoints on the PSTN through use of a PSTN gateway. Each of the endpoint devices includes data communications-enabled circuitry, and may include for example, IP phones, smart phones, tablets, desktop computers, plain old telephone service (POTS) telephones, and cellular-capable devices among other example devices with circuitry configured and arranged to facilitate sending and receipt of data communications.

According to more specific example embodiments, a high-level domain-specific programmable communication protocol (e.g., specific to customer-entity domains) uses one or more languages which are defined using a markup language as the basis for the language structure. Particular implementations relate to the use of at least two domain-specific languages, one that can be used for initial communication routing and the other for providing more complex and specific communication processing functions. More particular example embodiments use an eXtensible Markup Language (XML). An XML model defines the constraints on the high-level language, including defining the set of valid commands that can be carried out by the data communications servers. Within these constraints, a customer can write XML code that self-describes the building blocks or particular configurations used in the customer's particular application. For instance, a common set of instructions, written in the high-level language (e.g., an XML language) may be provided by a data communications provider to client entities. The common set of instructions may form a template to be populated with client-specific directives. The populated template forms programming instructions that instruct the data communications provider how a particular client entity is to be configured for various data communications services, and from which client-specific sets of control data are derived. In such a manner, the data communications provider may provide a lightweight and simplified set of instructions to client entities, and client entities may provide the data communications provider with instructions to customize the virtual office services for that particular client entity.

The high-level programming language also allows for various different data structures to be embedded. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as high-level markup languages (e.g., XML derivative languages or XML-type languages).

Various examples of such XML derivative languages are exemplified in the Appendix as attached to the underlying U.S. Provisional Patent document (Application No. 62/523,971 filed Jun. 23, 2017) incorporated herein by reference. In certain example data communications applications, two XML-type languages are implemented as a communication processing XML, and a communication routing XML, respectively as XML derivative languages corresponding to XML but customized for processing data communications on the side of the interface operating on behalf of customer entities and on the other side of the interface for higher level processing (including, for example, communication routing) by the data communications service provider. Such XML derivative languages can be written specific to types of functionality as needed for various customer entities, thereby allowing developers to program communication processing logic or service execution logic with both XML building blocks and JavaScript/TCL, or other scripting languages best suited to levels (e.g., in terms of quantity range) of a customer's endpoint devices and/or in terms of complexity of the data communications-based media functionality and evolving demands expected by a customer. In certain implementations, XML derivative languages allow data communications customer developers to program and integrate data communications communication flow (e.g., as provided by a cloud-based data communications service) with customer or third-party application servers and databases. In particular, the communication flow can include a connection that is used as part of communication routing decisions and communication processing options that are related to one or more receptionists that can answer communications to a group of endpoint devices. The system allows different levels of communication control logic to be implemented in a manner that can facilitate scalability of the system of large organizations with many endpoint devices and/or end-users and with complex organizational structures that have corresponding complex communication routing requirements and/or communication control requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related communications data can be provided in documents corresponding to other languages and/or communications protocols; for example, one such programming language can be used for initial communication routing and another programming language can be used for providing more complex and specific communication processing functions.

According to particular embodiments, an XML engine can respond to a communication, or other event, by sending requests to a web server and get XML derivative documents (e.g. a set of instructions) for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, communication control, flow control logic, and control of networked devices. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the data communications server provider's cloud database). This information can then be used to drive communication flow or communication control functionality and decisions.

According to various embodiments, the high-level programming language allows a programmer access to a communications solution by way of a controlled and limited set of instructions. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control of, or access to, the inner workings of the data communications servers. In a similar manner, the data communications customer can update or make changes to the manner in which endpoint devices of the data communications customer are controlled by the data communications provider, by providing to the data communications provider, a controlled and limited set of instructions pertaining to the data communications customer.

In various embodiments, the high-level programming language and the data communications servers that execute the high-level programming language can be configured to interface with other sources of data and control. This can include, for example, flow control decisions that are based upon code running on the client side or on the server side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

The set of instructions can include aspects and/or portions that are to be populated (e.g., supplemented) with client-specific directives associated with a manner in which endpoint devices for the client entity are to be controlled. For example, the data communications provider server can provide to each client entity, a common set of instructions defining various ways in which supported endpoint devices may be controlled by the data communications provider. This set of instructions may serve as a sort of template, or default configuration, of virtual office features provided to the client entities. In turn, the client entities may provide to the data communications provider server, programming instructions from which client-specific sets of control data are derived, where the client-specific sets of control data allow the data communications provider server to customize the virtual office features provided to each particular client entity. The client-specific sets of control data can be derived from programming instructions written in a second programming language that is compatible with the first programming language (e.g., that language in which the set of instructions from the data communications provider are written in). Moreover, the programming instructions can be generated by the client entity (by a client-specific control engine) by populating or combining the set of instructions received from the data communications provider server with a set of directives associated with the virtual office features available to the client entity. Such programming instructions, when received by the data communications provider server, can be stored as client-specific sets of control data and used to adjust the manner in which endpoint devices of the client entity are controlled by the data communications provider server, and/or a manner in which the endpoint devices interact with the data communications system (e.g., based on and according to the client-specific sets of control data).

The client-specific sets of control data may define a manner in which various networked devices (e.g., endpoint devices) are controlled via the data communications system. For example, various endpoint devices may be capable of voice interaction, music playback, making to-do lists, setting alarms, streaming podcasts, playing audiobooks, and providing weather, traffic, and other real time information, such as news. In such examples, the client-specific sets of control data may specify how frequently the networked devices collect data and how frequently data is communicated between various networked devices.

Similarly, client-specific sets of control data may define a manner in which endpoint devices may be controlled and/or monitored by the data communications system. For example, networked devices (e.g., IoT) may include devices for home automation (also known as smart home devices) that control automation of lighting, heating (like a smart thermostat), ventilation, air conditioning (HVAC) systems, and appliances such as washer/dryers, robotic vacuums, air purifiers, ovens, or refrigerators/freezers. The client-specific sets of control data may define a manner in which such networked devices communicate with the data communications system, a manner in which they communicate with one another, various parameters for remote monitoring of the networked devices, and the like. In some examples, the client-specific sets of control data may specify particular individuals and/or groups of individuals associated with a client entity that may access and/or control the networked devices associated with the client entity, using the data communications system.

Additionally and/or alternatively the client-specific sets of control data can allow clients to specify how the endpoint devices may be activated via the data communications system, and a language in which the endpoint devices may interact and communicate with the data communications system, among others. For instance, particular endpoint devices may be activated via the data communications system with a simple command such as "turn on", whereas other endpoint devices may be activated via the data communications system with a multi-step authentication process. Yet further, particular endpoint devices associated with a client entity may be controlled via the data communications system using voice commands in one language (such as Spanish), whereas a different endpoint device associated with the client entity may be controlled via the data communications system using voice commands in a different language (such as German).

In some examples, the client-specific sets of control data allow client entities to control, automate, and monitor endpoint devices associated with the client entity. Each client entity may identify various endpoint devices that are to be associated with the client entity, and therefore remotely controlled/accessed by the client entity. Each endpoint device may be identified by a device type (e.g., mobile phone, tablet computer, wearable device, smart appliance, etc.), by operating system and/or platform, by identification number, and other identifiers. The programming instructions provided by the client entity to the data communications provider may specify the addition of new endpoint devices, and/or specify a manner in which endpoint devices may be added.

In various embodiments, the data communications server may allow for control of endpoint devices of a client entity that utilize particular communication protocols. For instance, the endpoint devices utilizing communication protocols such as ZigBee, Z-Wave, and Bluetooth (among others) may be controlled remotely via the data communications system. The data communications system (via the data communications provider) may connect sensors and devices to one another and to the cloud, allowing them to communicate with various devices and end-users. Examples of the types of endpoint devices that may be accessed and/or controlled via the data communications system may include motion sensors, presence sensors, moisture sensors, locks, electrical outlets, garage door openers, speakers, thermostats, plain old telephones, cellular phones, laptop and/or desktop computers, among others.

An example of such control via the data communications system may be illustrated as follows. A motion sensor, a moisture sensor, a smart outlet, two fobs with presence sensors, and two multi-sensors that can detect movement, vibration, orientation and temperature, and a number of cellular phones may be associated with a particular client entity. The client entity may provide programming instructions to the data communications provider (in the second programming language) specifying a manner in which each of those devices may be controlled by the data communications system, and how each device is to communicate with one another. The data communications system allows client entities to set up each cellular phone (and/or computing device, as the case may be) to configure, communicate with, and control the various endpoint devices. By providing such customized programming instructions, client entities can trigger automatic actions through a simple voice dictation. For instance, an end user and/or client entity may adjust a motion sensor in a home through a simple voice command, as specified in the programming instructions provided to the data communications provider.

In various embodiments, a data communications client server may be provided, comprising one or more computer processor circuits coupled to memory circuits and configured to interface with the data communications provider server. The data communications provider server can be configured to provide a database of virtual office features available based on a subscription. Similarly, the data communications client server can receive from the data communications provider server, a set of instructions written in a first programming language that defines a message exchange protocol between the data communications provider server and data sources. The data communications client server can further generate programming instructions from which client-specific sets of control data are derived, the programming instructions written in a second programming language that is a subset of the first programming language. The second programming language may be considered a subset of the first programming language, and is associated with virtual office features available to the client entity. For instance, the client-specific sets of control data, provided in the second programming language, may further define and/or adjust the virtual office features provided to a client entity and/or end-users of the client entity. Similarly, the client-specific sets of control data may further define and/or adjust a manner in which endpoint devices associated with the client entity may be remotely controlled.

The data communications client server can transmit to the data communications provider server, programming instructions written in the programming language such that the endpoint devices of the client entity may be configured. In some instances, the client entity can allow the data communications provider to indirectly access data sources of the client entity. For example, the client entity can specify, in a second set of client-specific control data derived from the programming language, a uniform resource identifier (URI) that points to the data communications client server and specifies an associated query. The data communications client server can execute, for example, a local script that may rely upon customer data. The script can generate a response in the particular programming language, and the data communications provider server can then carry out communication routing, or other communication control functions, based upon the response and without ever having direct access to the customer data. As such, the data communications client server can be configured to provide programming instructions to retrieve data from the data sources in order to provide virtual office features to the endpoint devices and/or to otherwise control the endpoint devices.

Consistent with various embodiments of the present disclosure, programming instructions provided by the data communications client server to the data communications provider server may define various ways in which endpoint devices may be controlled by client entities and/or end-users of client entities. For instance, a client entity may wish to provide different levels of control to different subgroups of end-users, and/or to configure endpoint devices to communicate with the data communications system in a different manner for different subgroups of end-users. Such subgroups may differentiate administrators that have access to additional virtual office features from non-administrators that should not have access to such additional features. Similarly, such subgroups may differentiate different business units of end-users that have different needs compared to other business units.

Client-specific sets of control data may be derived from programming instructions provided by a client entity. The programming instructions may be generated by a client server responsive and according to client-specific directives. Consistent with the above-characterized embodiments, at the client side of the data communications services, the client's computer-based processing resource (e.g., by the client-specific control engine) generates and submits programming instructions for assessment and use by the data communications service provider. In a typical implementation, programming instructions provided by the client entity can be realized using codes or one or more commands (or a script of program-created commands). As examples, such codes or command sets can be implemented using a variety of programming control approaches. These approaches include, for example, a programming language (such as C++, XML, JAVA, HTML, SQL, etc.) common to both the client-specific control engine and to the data communications service provider, which receives the programming instructions (submitted from the client side) and stores client-specific sets of control data corresponding to the client-specific programming instructions for subsequent implementation.

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the programming instructions from which client-specific sets of control data are derived, can be generated and submitted in various (coded) ways such as described above and also, for example, by dial tone input generated remotely on behalf of each client, by smartphone app specific to the client, by voice recognition, or combinations thereof. The client-specific sets of control data for a particular client entity may be generated based on various data metrics including, for example, data communications events or data received from the data communications server, client-specific directives received in the form of user input (e.g., input via dial-tones and/or GUI), data acquired from a client (e.g., from a client database), and/or data provided by third parties (e.g., third party monitoring services).

Consistent with embodiments of the present disclosure, a method for use in a data communications system may be provided. The method may include receiving from a data communications server, a set of instructions written in a first programming language that relates to a message exchange protocol between the data communications provider server and data sources, and event data for routed data communications. As described herein, the method may include generating at a client server communicatively coupled to the data communications provider server and associated with a particular remotely-situated client entity, a set of instructions written in a second programming language by populating the set of instructions received from the data communications server with client-specific directives received as input on behalf of the client entity. For each of a plurality of endpoint devices associated with the client entity, an operating state may be determined such that the endpoint device may be controlled remotely via the data communications system. Responsive to the determination of the operating state of the endpoint devices, the method includes facilitating control of at least one endpoint device by communicating the operating state information for the endpoint devices to the data communications server and executing client-specific sets of control data derived from the set of instructions written in the second programming language. In some instances, the endpoint devices (e.g., IoT) of the client entity may be controlled in response to input from the client entity, such as in response to a voice command and/or prompt. Additionally and/or alternatively, the endpoint devices of the client entity may be controlled automatically, based on the client-specific sets of control data. For instance, a client entity may be configured to automatically turn on endpoint devices at a particular day and/or time without a command and/or prompt from the client entity.

Turning now to the figures, FIG. 1 shows a block diagram of a data communications-enabled system that uses a high-level programming language for communication control functionality and operations, consistent with embodiments of the present disclosure. The system includes a computing server 110 configured to provide data communications for a plurality of endpoint devices 152, 154, 156, 162, 164, and 166 connected in one or more data networks 130 and 140. The endpoint devices may include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data communications server. Registered devices for each client account may be listed in a respective account settings file (not shown) stored by the data communications servers 110. In this example, endpoint devices 152, 154, and 156 are associated within an account 150 for a first client A and endpoint devices 162, 164, and 166 are associated within an account 160 for a second client B.

The system includes one or more processing circuits configured to implement client-specific control engines 120, which are configured to adjust the data communications provided for each client account according to a respective set of control directives. For instance, the client-specific control engines 120 may adjust a manner in which endpoint devices 162, 164, 166 are controlled, and/or a manner of routing of a data communications for a client account, by generating client-specific sets of control data to the data communications server 110. For example, the client-specific control engines 120 may generate client-specific sets of control data by processing the respective set of control directives for the account in response to communication event data or other data prompts received from the data communications server(s) 110.

The control directives for a client account may generate the client-specific sets of control data based on various data metrics including, for example, data communication events or data received from the data communications server, user input (e.g., input via dial-tones and/or GUI), data acquired from a client (e.g., from a client database), and/or data provided by third parties (e.g., third party monitoring services). The client-specific control engines 120 communicate the client-specific control data to the data communications server(s) using an interface protocol having an instruction format that is independent of an instruction format used to implement the client-specific control engines 120 and/or client-specific control directives. The independent instruction format of the interface protocol allows clients to write client-specific sets of control data including complex logic and various data sources, for example, using various different high-level languages without regard to the particular language used to implement or communicate with the data communications provider server. In some embodiments, the instruction set of the interface protocol may be configured to limit customer control over certain data communications settings—thereby preventing clients from disrupting operations of the computing service with faulty client-specified directive code.

Different embodiments may implement the client-specific control engines 120 in various locations. For example, client-specific control engines 120 for one or more client accounts may be implemented in a central server connected to, or incorporated with, the data communication server(s) 110. Additionally or alternatively, one or more client-specific control engine(s) 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

As previously described, client-specific control engines may be used to facilitate control of endpoint devices associated with a client device. The control of the endpoint devices may be associated with a variety of virtual office features including, for example, data communications services such as VoIP calls, audio and/or video conferencing, IPBX exchange servers, packet switching, and traffic management as well as non-data communications services including, but not limited to, website hosting, remote data storage, remote computing services, virtual computing environments. One or more of such virtual office features may be provided, for example, by a cloud computing network having one or more servers configurable to provide a data communications system for a plurality of clients.

Figure 2:
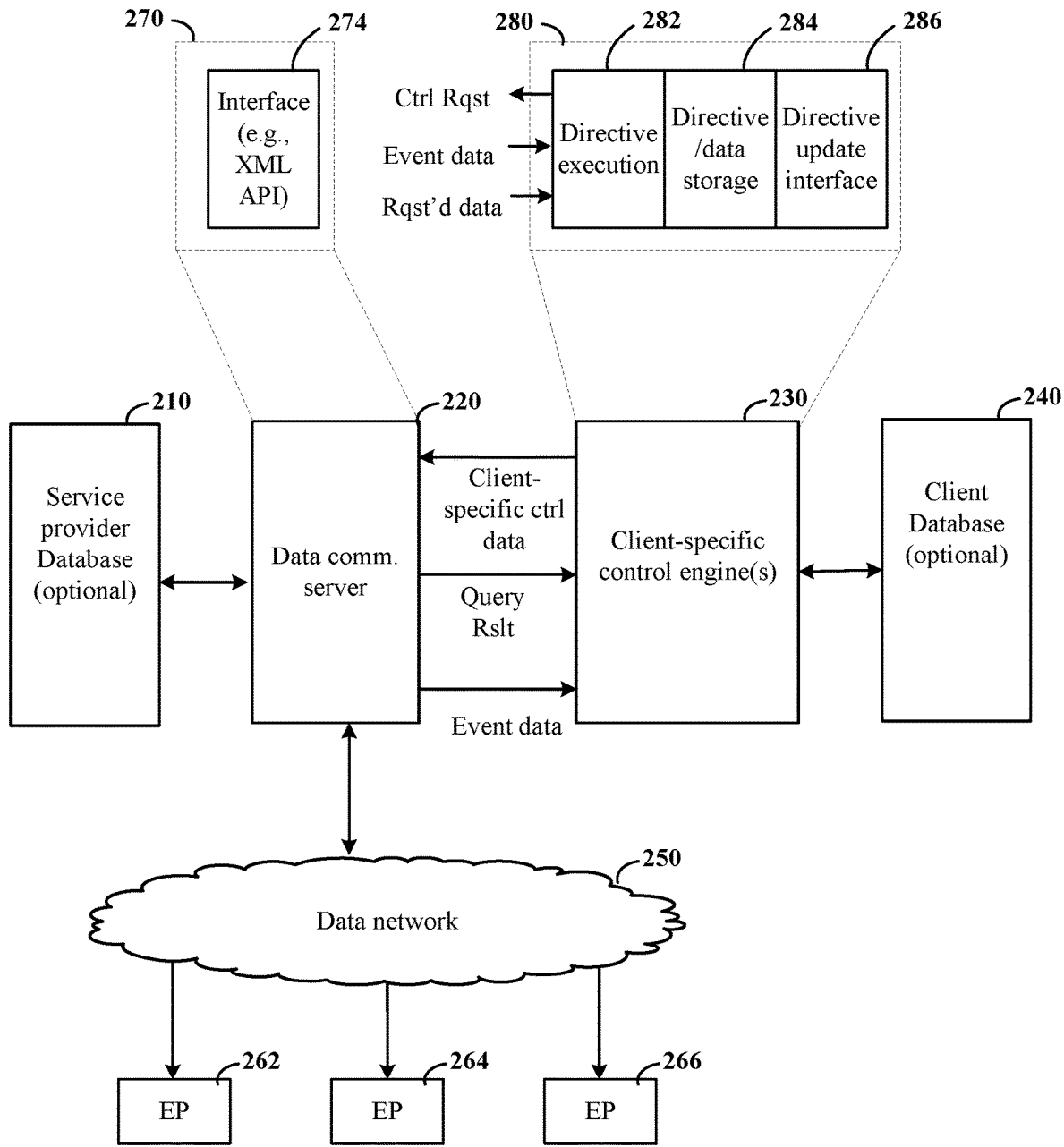
FIG. 2 is a block diagram of a communication control engine with high-level programmable language logic for two different languages, consistent with embodiments of the present disclosure.

FIG. 2 is a block diagram of a communication control engine with high-level programmable language logic for two different languages, consistent with embodiments of the present disclosure. The system includes a data communications provider server 220 configurable to provide one or more virtual office features for a plurality of endpoint devices 262, 264, and 266 connected in a data network 250. The endpoint devices may include data communications-enabled devices (e.g., IP phones, smart phones, tables, and/or desktop computers) and/or non-data communications endpoint devices (e.g., plain old telephone service (POTS) telephones and cellular-capable devices). Each endpoint device is respectively associated with an account of a respective client.

The system includes a processing circuit(s) configured to implement client-specific control engines 230. The client-specific control engines 230 are configured, as described with reference to client-specific control engines 120, to adjust the virtual office features (e.g., data communications) provided for each client account according to a respective set of control directives. For instance, the client-specific control engines 230 may dynamically adjust settings for the virtual office features provided for a client by data communications provider server 220 according to the one or more sets of control directives specified for the client account. The client-specific control engines 230 are also configured to adjust a manner in which each respective endpoint device of a particular client entity is controlled and/or accessed by the data communications system.

As described with reference to FIG. 1, the control directives for a client account may generate the client-specific sets of control data based on various data metrics including for example, data communications events or data received from the data communications server, data acquired from a client (e.g., from a client database), and/or data provided by third parties (e.g., third party monitoring services). In some embodiments, the control directives may cause the client-specific control engine 230 to query data from a client database 240 or from a service provider database 210. In some embodiments, the control directives may cause the client-specific control engine 230 to issue an analytics request specifying a particular evaluation of data in a database (e.g., 210 or 240). For example, client-specific control data communicated to the data communications provider server 220 may prompt the data communications provider server 220 to perform a particular analytical evaluation of data stored in the service provider database 210. After completing the requested evaluation, the data communications provider server 220 communicates the result back to the requesting client-specific control engine 230. Data retrieved from the databases and/or via analytics evaluation may be used, for example, to dynamically adjust the virtual office features provided during operation.

The client-specific control engines 230 communicate the client-specific control data to the data communications communication server(s) using an interface protocol having an instruction format that is independent of an instruction format used to implement the client-specific control engines 230 and/or client-specific control directives.

As previously described, the independent instruction format of the interface protocol allows clients to write client-specific sets of control data, for example, using their preferred high-level programming and/or may be used to limit customer access and/or control over the data communications provider server. For example, the interface protocol may be configured to allow the client-specific control engines to request analysis of data in the service provider database 210 without allowing direct access to the raw data stored therein. Similarly, the client-specific control engines may be configured to request analysis of data in the client database 240, without allowing direct access to the raw data stored therein.

As described with reference to FIG. 1, client-specific control engines 230 may be implemented in various locations. For example, client-specific control engines 230 for a particular client account may be implemented in the data communications provider server(s) 220, in a separate processing circuit communicatively connected to the data communications provider server(s) 220, using one or more processing circuits of the client, or a combination thereof.

The data communications provider server 220 and client-specific control engines 230 may be implemented using various circuit arrangements. Block 270 shows an example implementation of a data communications provider server configured to provide a data communications IPBX service for a client. The example data communications provider server 270 includes one or more IPBX server(s) configured to establish and direct data communications for a plurality of endpoints of a customer account. Interface circuit 274 is configured to allow different client specific control engines to communicate with the data communications provider server 220 via a common high-level language instruction set (e.g., a set of XML instructions).

Block 280 shows an example implementation of a client-specific control engine 230. In this example, the client-specific control engine includes a storage circuit 284 configured to store control directives and/or data for one or more client accounts. Directive execution circuit 282 is configured to provide client-specific control of the remote services provided for a client via execution of the control directives for the client stored in storage circuit 284. In some implementations, the directive execution circuit 282 is configured to communicate client-specific control data to the data communications provider server 220, for example, via an interface, using a high-level language instruction set (e.g., a set of extensible meta-data language (XML) instructions). Additionally or alternatively, the directive execution circuit 282 may retrieve one or more sets of directives from an external source (e.g., a client database). In this example, the client-specific control engine shown in block 280 includes a directive update interface circuit 286 configured to facilitate upload and/or editing of control directives for a client account.

Figure 3:
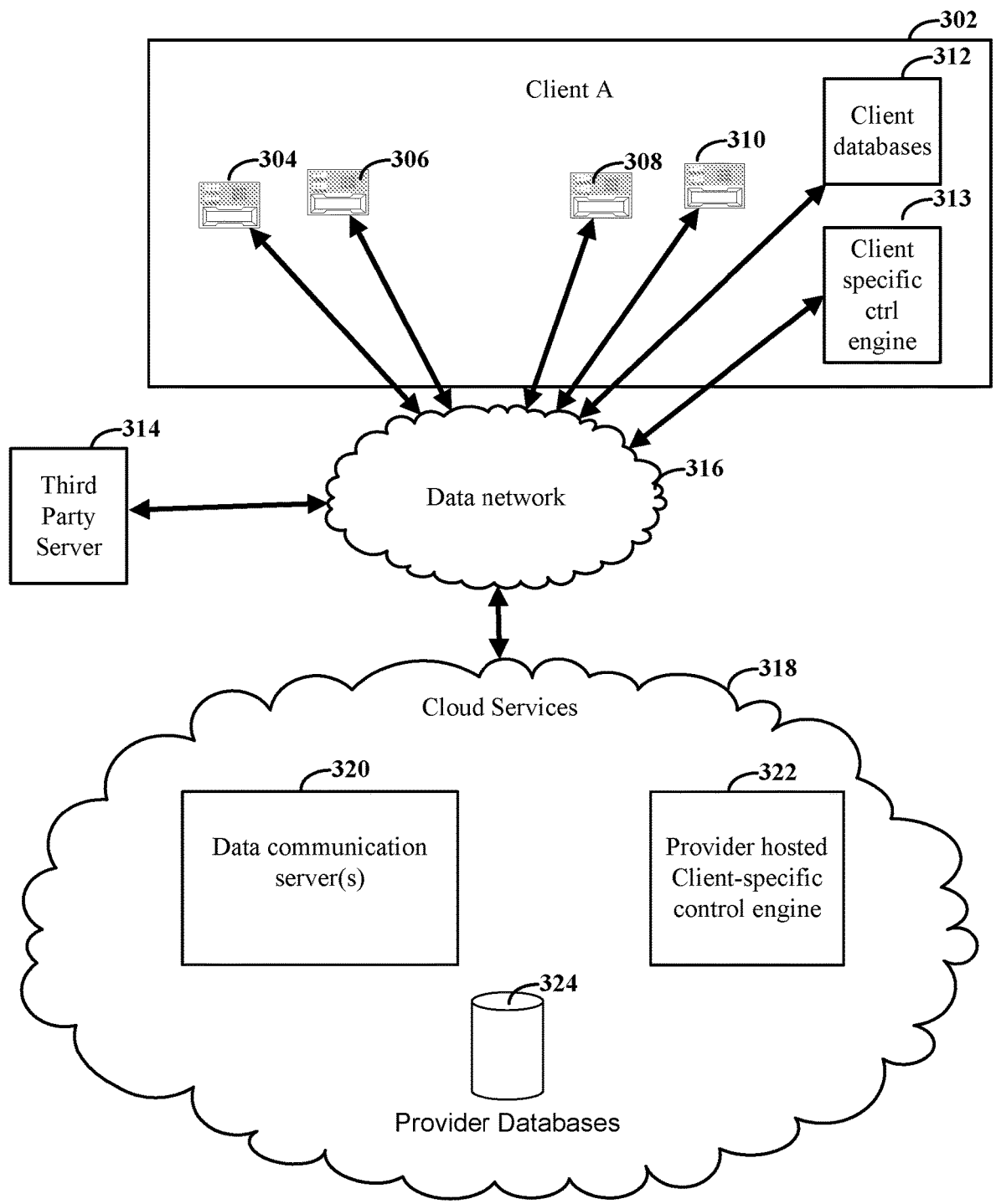
FIG. 3 is a block diagram showing the use of a hierarchy of programmable language documents, consistent with embodiments of the present disclosure.

FIG. 3 is a diagram for a system that uses a high-level programming language for communication control operations, consistent with embodiments of the present disclosure. In connection with these specifically-illustrated examples, data communications endpoint devices 304, 306, 308, and 310 connected in a data network 316 are configured to place and receive data communications between other data communications endpoint devices, and/or between non-data communications endpoint devices. Non-data communications endpoint devices may include, for example, plain old telephone service (POTS) telephones and cellular-capable devices, which might also be data communications capable (e.g., smart phones with appropriate data communications software applications). The various endpoint devices include circuitry that is specially configured to provide communications functions that include interfacing with the appropriate circuitry of the communication service provider used by the corresponding endpoint device. In many contexts, a data communications endpoint device is a data communications-capable telephone commonly referred to as IP phones. The data communications endpoint devices can include, but are not limited to, desktop computers, mobile (smart) phones, laptop computers, and tablets. When each of the endpoint devices originates or receives a communication in a telephone network, each can be characterized or referred to as an addressable communication endpoint.

The communication routing and other services for the data communications telephone communications can be provided by one or more data communications servers 320 within a cloud services system 318 (e.g., configured to provide virtual office features to customers of the data communications provider). In particular example embodiments, the data communications servers 320 can be located within the cloud services system 318. The cloud services system 318 also includes one or more provider hosted client-specific control engines 322, configured as described with reference to 230 in FIGS. 2 and 120 in FIG. 1. A client-specific control engine 313 may also be implemented locally by a client (e.g., 302). In some embodiments, data centers can be part of a cloud-based system 318 where the hardware providing the cloud services is located in a number of different data centers with different physical locations. Consistent with embodiments, the cloud services can include SIP servers, media servers, and servers providing other services to both data communications endpoint devices and the users of the data communications endpoint devices. In some instances, the various servers, including both the data communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data communications server uses session initiation protocol (SIP) to handle various communication functions (e.g., communication setup and tear down); however, the various embodiments discussed herein are not necessarily limited thereto. Consistent with the above and other embodiments disclosed herein, the data communications servers can be configured to establish a portion of the communication from the data communications endpoint devices to another data communications endpoint device, or to a gateway.

According to various embodiments, one or more data analytics servers can monitor and analyze communication data relating to the data communications servers and data communications endpoint devices. For example, a data analytics server can be designed to track communication statistics about various different communication-related parameters, such as communication duration, communication date, communication time of day, called parties, endpoint devices, selected data centers, selected carriers, dropped communications, transferred communications, voicemail access, conferencing features, and others. The high-level programming language(s) and the data communications servers executing the languages can access the communication summary metrics and the data analytics, which can be stored in a provider database 324. For example, a script running the data communications server could parse communication processing XML (CPXML) documents to generate database queries that direct the data communications server to query, or subscribe to, communication length summaries for all communications made to endpoints that are registered to the data communications server. The script could then use the information to control how communications are routed as well as how different (customer or provider) services are invoked. According to various embodiments, the database queries could be sent to a customer database 302.

Consistent with certain embodiments, the data communications server can be configured to interface with customer databases 312, or with third party servers 314. For instance, a CPXML document stored by the cloud-based system 318 can identify, based upon a received communication, a Uniform Resource Identifier (URI) that points to customer databases 312, or to a third-party server 314. Control directives provided from these servers, for example, in the form of a CPXML document can be used to specify communication routing, or other functions.

Figure 4:
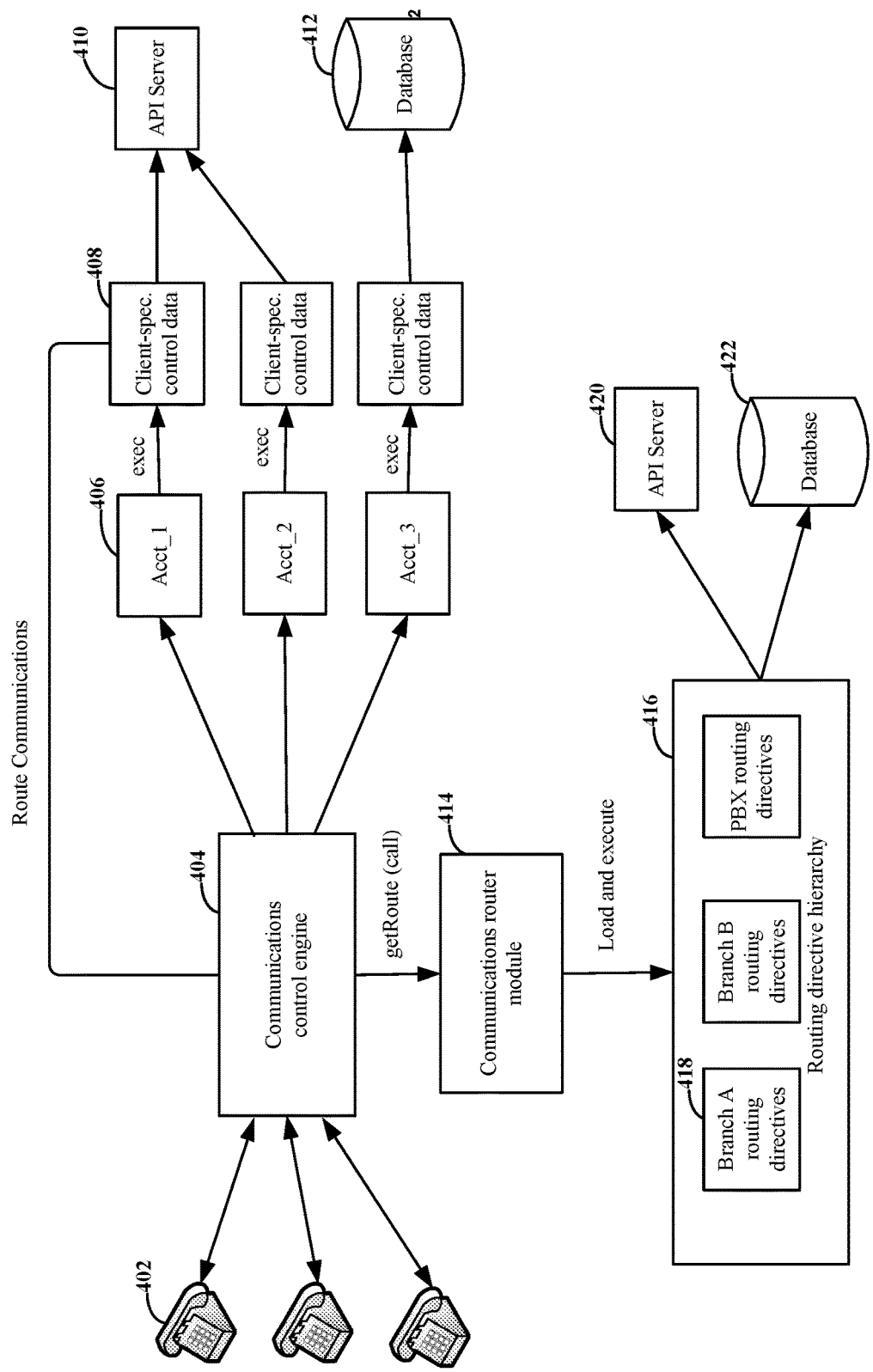
FIG. 4 is a block diagram showing the use of a hierarchy of programmable language documents, consistent with embodiments of the present disclosure.

FIG. 4 is a block diagram showing the use of a hierarchy of programmable language documents, consistent with embodiments of the present disclosure. Communication control engine 404 can provide communication flow control and routing in a manner that can be consistent with discussions found herein and relating to communication control engines, data communications servers, and the other figures. Consistent with various embodiments, the communication control engine 404 is a PBX that is part of a data communications system. For instance, the PBX can be configured using Java-based applications that manage data communications networks. The PBX can be hosted by a data communications service provider and located at one or more data centers. Various PBX features can be provided, such as communication forwarding, remote pickup, communication routing, and voice mail.

Consistent with various embodiments, customers of a data communications provider can use the data communications system by generating documents written in both CRXML and CPXML. Together, the documents specify how the customer would like communication intercept to be handled for both inbound and outbound communications. For instance, a CPXML document 408 can be associated with an extension account 406, or with groups of extension accounts. The extension accounts 406 can represent a specific individual and their associated extension number(s). A CPXML document 408 that is configured in this manner will be invoked by the communication control engine 404 after an incoming communication is routed to an extension that has CPXML capabilities enabled. CPXML documents can also be used for communication flow processing of outbound communications. The CPXML document may provide logic for sophisticated communication flow control functions for outbound communications. For example, messages (e.g. text messages and email messages) can be automatically generated in response to outgoing communications and restrictions can be placed on outbound communications based upon factors such as time of day or communication history. Another CPXML function could be implementation of auto attendants that are each specific to the CRXML-specified routing decision.

The communication control engine 404 may also consult with communication routers 414. The communication routers can be programmed using CRXML documents 418, and with JavaScript for dynamic data access and logic handling. The CRXML documents 418 can be arranged in router xml hierarchy 416, which can specify different CRXML documents 418 depending upon the branch or PBX that is identified as corresponding to the communication. Once the communication router documents are loaded, they can be cached in memory and used by the communication control engine 404 to make a routing decision. When a communication is routed through the communication control engine 404, the communication control engine can consult with high-level CRXML documents. The branch level can be identified, for example, based on the branch ID of caller (for outbound calls) or callee (for inbound calls). Delineations other than the branch are also possible, such as by called country, a particular store, a state, or others. If a route result is not determined, the communication control engine 404 can also consult with PBX-level CRXML document to obtain routing decisions. Examples of a route result from a script are "Accept", "Reject", or "NewRoute." Thus, the programmable communication router (CRXML) module 414 provides the communication control engine 404 with the ability to handle communication intercept/filter reject or re-route the communication to a different target destination.

The communication router module 414 can also interact with a CPXML document to handle sophisticated communication flow scenarios where the communication routing is changed after the initial determination. For example, the CPXML can include commands (e.g., "reroute") that the communication control engine 404 uses to provide feedback to the programmable communication routers 414, which use CRXML for initial routing decisions. This might allow, as an example, a CRXML routing decision to be overridden by the CPXML document(s).

According to particular embodiments, the programmable communication routers (using CRXML) 414 can be viewed as plugins to the communication control engine 404. The communication router plugins may have two levels—Branch and PBX levels. The communication router supports CRXML-defined structures that specify how the PaaS can be utilized by a customer. For example, the CRXML can define sets of conditional statements, data access requests, and communication routing commands: if/else, condition, goto, log, var, script, query, data, accept, reject, route statements, or other similar commands. In particular embodiments, CRXML can be considered a subset of CPXML by containing a part, but not all, of the CPXML communication flow commands. This distinction can be useful for keeping CRXML documents light weight so that communication routing decisions are simplified and efficient. More complex tasks, such as the use of media and advanced communication handling, can be handled using CPXML. Using such programmable communication routes, a few example uses include: school district that generates SMS/Email notifications to parents whenever an emergency number is dialed; off hour restriction of outbound communication with CPXML; communication center lockdown to provide outbound dialing restriction for phones; computer initiated dialing with caller identification (ID) override based destination database table, and communication return to target DID/agents; and implementation of a communication blacklist (denying communications to/from the list) or whitelist (allowing communications to/from the list) with potentially large lists and dynamic updating capabilities.

Consistent with embodiments of the present disclosure, both CRXML and CPXML provide the capability of handling dynamic data from multiple sources. Examples of these sources are depicted as application program interface servers 410, 420 and databases 412, 422. The dynamic data can therefore be provided from a variety of sources including, but not necessarily limited to, communication route session data (caller ID, callee ID, or route from/to), query custom object (to a database) in the data communications provider system/cloud, and access data through HTTP RESTful API. For instance, the XML documents can include a web resource that is identified by Uniform Resource Identifiers. The web resource might be a customer HTTP server that responds to a conditional query (e.g., whether a communication queue is above a threshold) with CPXML code that instructs the communication control engine on how to route, or otherwise handle, the communication. In such a manner, client-specific sets of control data provided by the communication control engine may allow for adjusted (e.g., customized) virtual office features for end users (such as 402) of the data communications system.

Figure 5:
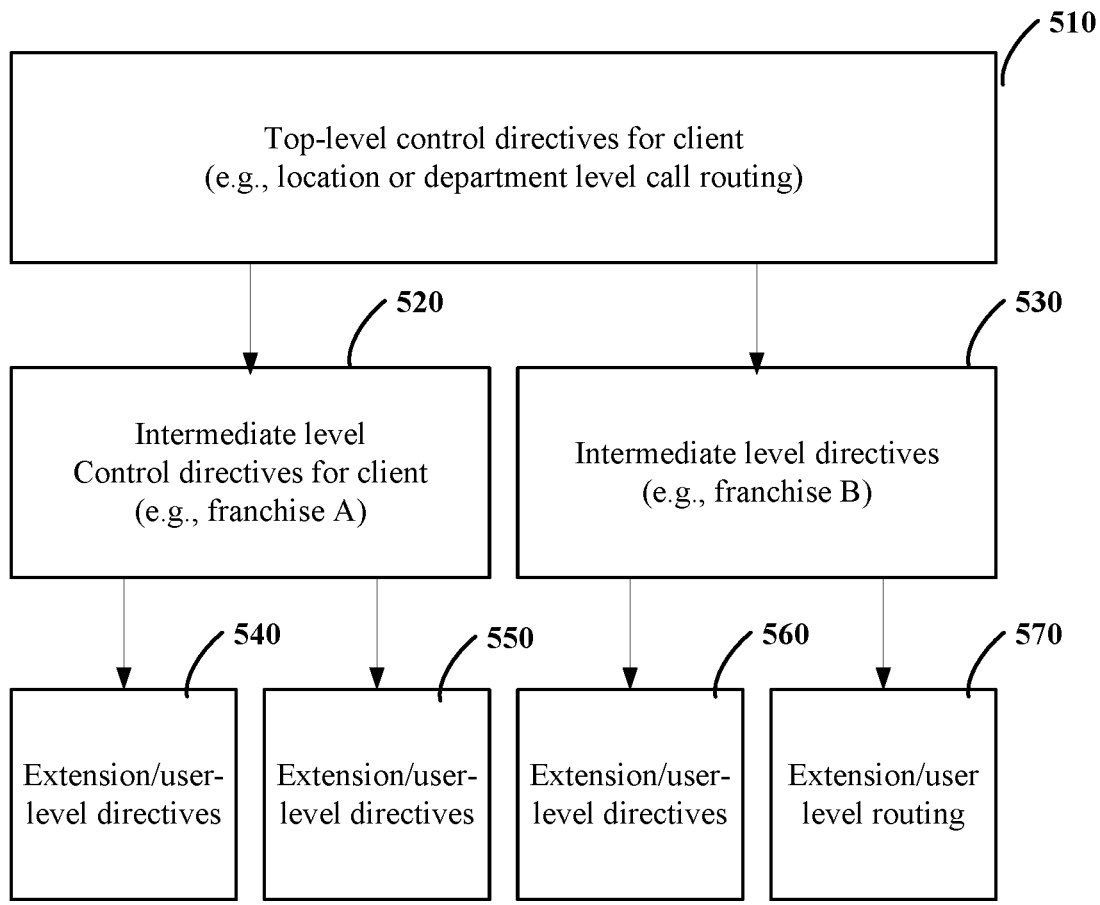
FIG. 5 is a block diagram showing an example set of control directives configured for multiple levels of control, consistent with embodiments of the present disclosure.

FIG. 5 is a block diagram showing an example set of control directives configured for multiple levels of control, consistent with embodiments of the present disclosure. The control directives described herein can be used to form client-specific sets of control data which can be transmitted to the data communications provider for adjusting a manner in which endpoint devices of a client entity are controlled by the data communications system. In this example, block 510 provides a set of top-level control directives that are applicable to all endpoint devices for a client. Blocks 520 and 530 show a set of intermediate-level control directives that are applicable only to a subset of endpoints included in the client account (e.g., for respective IPBXs, branches, department, and/or franchisees). Blocks 540, 550, 560, 570 are shown as lower-level control directives that are applicable to particular extensions, particular endpoint devices, and/or end-users of the client account. The lower-level control directives may be useful, for example, for an end-user to customize and/or dynamically adjust control of endpoint devices used by the particular end-user.

Figure 6:
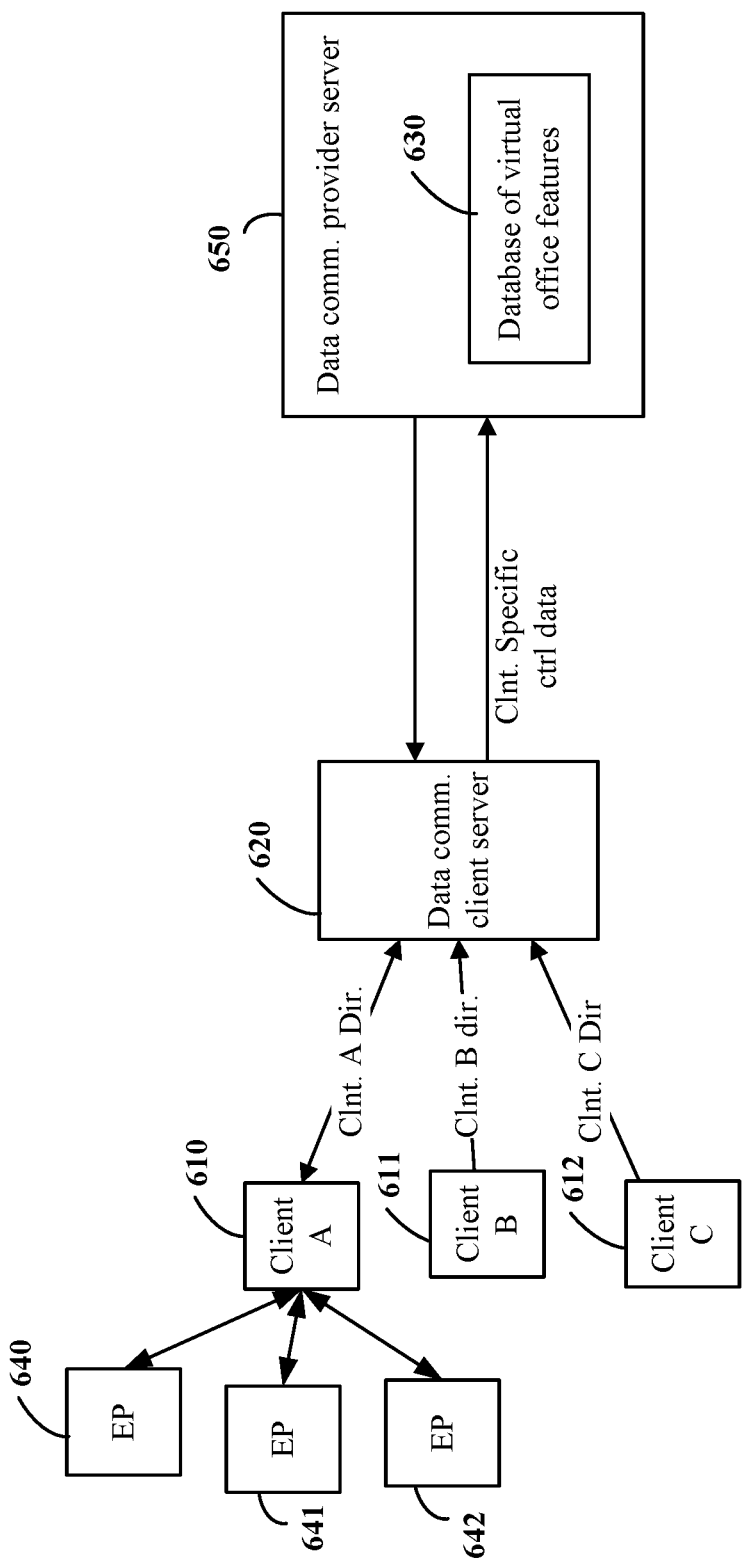
FIG. 6 is a block diagram showing the control of networked devices using a high-level programming interface, consistent with embodiments of the present disclosure.

FIG. 6 is a block diagram showing the control of networked devices using a high-level programming interface, consistent with embodiments of the present disclosure. Specifically, FIG. 6 shows a block diagram including a data communications provider server (e.g., 650) and a data communications client server (e.g., 620) configured to provide customized control to various client endpoint devices 640, 641, and 642. As discussed herein, each client entity 610, 611, and 612 may be configured to interface with a data communications provider server 650 providing a database of virtual office features available based on a subscription, via a data communications client server 620. Each of a plurality of client entities 610, 611, and 612 may be associated with one or more different endpoint devices 640, 641, and 642. The data communications provider server 650 may provide a database of virtual office features 630 that are available to the client entities 610, 611, and 612 based on a subscription.

To provide customized control of endpoint devices of a particular client entity, the data communications client server 620 may provide instructions to the data communications provider server 650 defining a manner in which each of the endpoint devices is to be controlled and/or accessed by the data communications system. Such instructions may be written in a particular programming language, as described herein. For instance, client entity A (e.g., 610) may provide a set of client-specific programming instructions to the data communications client server 620. The data communications client server 620 may generate client-specific sets of control data for client A based on the received client-specific programming instructions. The client-specific sets of control data for client A may be received by the data communications provider server 650, and used to control endpoint devices 640, 641, and 642.

More Detailed and/or Experimental Embodiments

Consistent with the above-characterized embodiments, various other embodiments are based on implementations which involve alternative features and/or involving a type of programming language which is different than disclosed above for use as part of the above embodiments. Accordingly, the present disclosure is not necessarily limited to specific methods, systems, applications and devices in and stemming from the specific embodiments disclosed herein. Other related embodiments and aspects can be fully incorporated in each such disclosed (contemplated/suggested) embodiment. Some of these aspects and embodiments would be recognized from the following discussion.

In certain embodiments, the client-specific control engines provide client-specific control data to the data communications server(s) via an interface protocol platform that characterizes the format in which the client-specific sets of data are communicated to the data communications server. According to various embodiments, data is communicated via the interface protocol platform using high-level programming language instruction set. The high-level programming language instruction set allows a programmer access to the data communications server(s) (or PaaS computing server(s) providing remote services) by way a controlled and limited set of communication control operations and functions. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control or access the inner workings of the data communications servers.

Consistent with the above discussion, at the client side of the data communications services, the client's computer-based processing (e.g., by the client-specific control engine) generates and submits control (routing/data-communication) directives for assessment and use by the data communications service provider. In a typical implementation, these directives can be realized using codes or one or more commands (or a script of program-created commands). As examples, such codes or command sets can be implemented using a variety of programming control approaches. These approaches include, for example, a programming language (such as C++, XML, JAVA, HTLM, SQL, etc.) common to both the client-specific control engine and to the data communications service provider, which receives the directives (submitted from the client side) for adjusting the data communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). For instance, entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.).

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone app specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters According to embodiments of the present disclosure, the data communications servers can be configured to use different high-level programming languages for different functions, where each programming language has a different set of commands. For example, a first high-level programming language can be used to create documents that control communication routing decisions for high volumes of communication traffic, as might occur at the edge of a data communications provider's system. These communication routing decisions can, for example, identify a particular branch office or an IPBX of a particular customer. The identified IPBX might then have additional documents written to communicate using a second high-level programming language that is tailored toward more specific communication processing capabilities that might be associated with a particular account or another identifiable grouping. The distinction between the two programming languages can be particularly useful in terms of improving the scalability of the system. For instance, the language used for communication routing decisions can be relatively light weight, with fewer commands and capabilities. In particular implementations, the first (communication routing) language can contain a subset of the commands available in the second (communication processing) language.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the data communications servers. Within these constraints, a customer can write XML code that self-describes the building blocks used in the customer's particular application. Another aspect of the communication processing XML is that it allows for various different data structures to be embedded into the XML document or file. For example, a script written in Javascript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s).

Particular implementations relate to the use of two separate languages, one that can be used for initial communication routing and the other for providing more complex and specific communication processing functions. In various portions of the present disclosure, the two languages are referred to as either communication processing XML (CPXML) or communication routing XML (CRXML).

The data communications servers providing the underlying function for the PaaS can be configured to utilize a high-level, domain-specific programming language. A particular example language is referred to as Communication Processing eXtensible Markup Language (CPXML). CPXML refers to a communication processing language which defines the message exchange protocol between a communication control server (e.g., an IntraSwitch with a CPXML Engine) and other sources of information, such as databases, web applications, authentication servers, and servers providing various communication-related services. CPXML can allow developers to program communication processing logic or service execution logic with both XML building blocks and JavaScript/TCL, or other scripting languages. In certain implementations, CPXML allows PaaS customer developers to program and integrate data communications flow (e.g., as provided by a cloud-based data communications service) with customer or third-party application servers and databases.

A CPXML engine can send requests to a web server and get XML (CPXML) responses for processing, thereby operating in a stateless manner that is similar to HTML/Internet browser. The CPXML engine can interpret a received CPXML response, and render (execute) CPXML building blocks. Each building block can define functions relating to voice, communication control, and flow control logic. The CPXML engine may also execute other types of code, such as JavaScript, to create dynamic content (e.g., dynamically generated CPXML) for client-side flow control. Each CPXML document may have URL links to a web server for iterative processing, or it may include query requests for retrieving data from various sources. A query could be formatted for consistency with the source of the data (e.g., by using JavaScript Object Notation (JSON) to retrieve data from third party application servers or from the data communications server provider's cloud database). This information can then be used to drive communication flow or communication control decisions.

CRXML defines a limited set of commands to the communication routing logic that allows a customer to define how a communication is initially routed. Maintaining the CRXML as a limited set of simple building block commands can help with the efficiency of the communication control switch. For example, the communication control switch can be located at the perimeter of the data communications provider's routing network, which implies that it may be required to handle a large volume of data communications. The efficiency in processing the large volume of communications can have a significant impact on the performance of the system.

Consistent with various embodiments, the CRXML documents specify a first level of communication routing and simple communication processing that are carried out by the communication control switch. For example, a communication control switch may provide communication routing options for multiple branch offices or locations and for multiple PBXs that support the branch locations. Each branch and PBX may have multiple customer (user) accounts associated therewith. CRXML documents can be used to determine the routing for a communication by identifying a particular branch location, a particular PBX and particular data communications customer account to use in subsequent communication processing and routing. The initial routing decision is indicated by the arrow labelled as "account selection," which shows the passage of control to a communication processing engine.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (data communications) endpoint device (or endpoint) includes a communication circuit and (computer) processing circuits which are configured to establish (data communications) communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A method comprising:

using, via at least one data communications server, a set of instructions written in a first programming language to provide, over a data-communication network, a set of virtual office features as part of data-communications services available to remotely-situated client entities;

generating at and/or receiving from a remotely-located client server communicatively coupled to the data communications server via a broadband communications network and associated with a particular one of the remotely-situated client entities, another set of instructions written in a second programming language by populating the other set of instructions with client-specific directives, wherein the second programming language is a subset of the first programming language, is associated with the set of virtual office features and has less than all of the instructions available from the first programming language, and corresponds to a high-level scripting computer language that defines constraints on a set of valid instructions that can be carried out by the data communications server; and using the client-specific directives to adjust selected ones of the set of virtual office features for each of a plurality of endpoint devices that is associated with the particular one of the remotely-situated client entities.

2. The method of claim 1, further including using the client-specific directives to provide control over an operating state of at least one of the plurality of endpoint devices.

3. The method of claim 1, wherein at least one of the plurality of endpoint devices refers to or includes an Internet of Things (IoT) circuit having a data-communications receiver.

4. The method of claim 1, further including facilitating control of at least one of the plurality of endpoint devices by communicating operating state information for the endpoint devices to the data communications server and by responding to the client-specific directives.

5. The method of claim 1, wherein at least one of the plurality of endpoint devices refers to or includes an Internet-enabled communication circuit having a data-communications receiver configured to respond to the data communications server for being controlled in response to the client-specific directives from the particular one of the remotely-situated client entities.

6. The method of claim 1, wherein at least one of the plurality of endpoint devices refers to or includes an Internet of Things (IoT) circuit having a data-communications receiver configured to respond to the data communications server for being controlled in response to the client-specific directives from the particular one of the remotely-situated client entities.

7. The method of claim 1, wherein at least one of the plurality of endpoint devices refers to or includes an Internet of Things (IoT) circuit which is controlled in response to input, in the form of a voice command or prompt, provided from the particular one of the remotely-situated client entities.

8. The method of claim 1, wherein the set of virtual office features refers to or includes at least one type of data communications, and at least one of the plurality of endpoint devices is controlled automatically based on the client-specific directives from the particular one of the remotely-situated client entities.

9. The method of claim 1, wherein at least one of the plurality of endpoint devices is controlled automatically based on the client-specific directives, from the particular one of the remotely-situated client entities, and at least one of which directs that said at least one of the plurality of endpoint devices is to automatically change from one operating state to another operating state, without a command and/or prompt from an individual on behalf of the particular one of the remotely-situated client entities, at an arranged indication of time which refers to or includes at least one of: a particular day, and a particular time.

10. The method of claim 1, wherein the client-specific directives indicate a type of system supported by at least one of the plurality of endpoint devices.

11. The method of claim 1, further including identifying each of the plurality of endpoint devices by at least one of a device type, an operating system, and an identification number, and facilitating control of the plurality of endpoint devices based on the respective identification.

12. The method of claim 1, further including using the client-specific directives to add new endpoint devices as being associated with the particular one of the remotely-situated client entities.

13. The method of claim 1, further including identifying and conveying operating state information, pertaining to at least one of the plurality of endpoint devices, to the data communications server and equipping the data communications server to execute client-specific sets of control data derived from the other set of instructions written in the second programming language.

14. The method of claim 1, wherein the client-specific directives specify, for certain endpoint devices from among the plurality of endpoint devices that are associated with the particular one of the remotely-situated client entities, at least one of: a manner in which the certain endpoint devices are to be controlled; and a manner in which the certain endpoint devices are to be monitored.

15. The method of claim 1, wherein the client-specific directives specify, for certain endpoint devices from among the plurality of endpoint devices that are associated with the particular one of the remotely-situated client entities, at least one of: a frequency with which the endpoint devices communicate collected data with others of the endpoint devices; and a frequency of data collection for the endpoint devices.

16. The method of claim 1, further including communicating data between a plurality of connected endpoint devices from among the plurality of endpoint devices that are associated with the particular one of the remotely-situated client entities.

17. The method of claim 1, further including communicating data between a plurality of connected endpoint devices, from among the plurality of endpoint devices that are associated with the particular one of the remotely-situated client entities, based on client-specific sets of control data derived from the other set of instructions written in the second programming language.

18. The method of claim 1, wherein certain endpoint devices, from among the plurality of endpoint devices that are associated with the particular one of the remotely-situated client entities, are to store and communicate data including at least two of: voice interaction, music playback, making to-do lists, setting alarms, streaming podcasts, playing audiobooks, providing weather information, and providing traffic information.

19. A non-transitory storage medium storing instructions which, in response to being executed by a computer processor circuit, cause a set of steps to be carried out, the set of steps comprising:
   using a set of instructions written in a first programming language to provide, over a data-communication network, a set of virtual office features as part of data-communications services available to remotely-situated client entities;
   generating at and/or receiving over a broadband communications network from data-processing computer circuitry associated with a particular one of the remotely-situated client entities, another set of instructions written in a second programming language by populating the other set of instructions with client-specific directives, wherein the second programming language is a subset of the first programming language with less than all of the instructions available from the first programming language, corresponds to a high-level scripting computer language that defines constraints on a set of valid instructions that can be carried out by server computer circuitry providing the data-communications services, and is associated with the set of virtual office features; and
   using the client-specific directives to adjust selected ones of the set of virtual office features for each of a plurality of endpoint devices that is associated with the particular one of the remotely-situated client entities.

20. An apparatus comprising:
   a computing-processor circuit to
      use a set of instructions written in a first programming language to provide, over at least one data-communication network, a set of virtual office features as part of data-communications services available to remotely-situated client entities;
      receive over at least one broadband data-communication network and from data-processing computer circuitry which is associated with a particular one of the remotely-situated client entities, another set of instructions written in a second programming language by populating the other set of instructions with client-specific directives, wherein the second programming language is a subset of the first programming language with less than all of the instructions available from the first programming language, corresponds to a high-level scripting computer language that defines constraints on a set of valid instructions that can be carried out by server computer circuitry that is to provide the data-communications services, and is associated with the set of virtual office features; and
      adjust selected ones of the set of virtual office features, for one or more of a plurality of endpoint devices associated with the particular one of the remotely-situated client entities, based on the client-specific directives.

* * * * *